United States Patent [19]

Hermsen et al.

[11] Patent Number: 5,135,766
[45] Date of Patent: Aug. 4, 1992

[54] PROCESS FOR THE DECAFFEINATION OF RAW COFFEE

[75] Inventors: Manfred Hermsen, Hellwege; Wolfgang Sirtl, Bremem, both of Fed. Rep. of Germany

[73] Assignee: CR-Kaffeeveredelung M. Hermsen GmbH & Co., Bremen, Fed. Rep. of Germany

[21] Appl. No.: 728,769

[22] Filed: Jul. 8, 1991

Related U.S. Application Data

[63] Continuation of Ser. No. 488,375, Feb. 23, 1990, abandoned, which is a continuation of Ser. No. 271,097, Nov. 14, 1988, abandoned.

[30] Foreign Application Priority Data

Nov. 14, 1987 [DE] Fed. Rep. of Germany ....... 3738783

[51] Int. Cl.$^5$ ............................................. A23F 5/20
[52] U.S. Cl. ................................. 426/427; 426/595
[58] Field of Search ........................................ 426/427

[56] References Cited

U.S. PATENT DOCUMENTS

| | | | |
|---|---|---|---|
| 3,879,569 | 4/1975 | Vitzhum et al. | 426/427 |
| 4,322,445 | 3/1982 | Peter et al. | 426/427 X |
| 4,472,442 | 9/1984 | Katz | 426/428 |
| 4,767,634 | 8/1988 | Kaleda et al. | 426/422 |

OTHER PUBLICATIONS

M. Hirata et al., "The Theory and Practice in Supercritical Fluid Technology", Verlag, Tokyo 1987, pp. 233-269.

E. Stahl et al., "Verdichtete Gase zur Extraktion und Raffination (Compressed Gases for Extraction and Refining)", Springer-Verlag Berlin, Heidelberg, New York, London, Paris, Tokyo 1987, p. 99.

R. J. Clarke and R. Macrae, "Coffee", 1, Chemistry, Elsevier Applied Science Publishers, London and New York 1985, p. 239.

*Primary Examiner*—Joseph Golian
*Attorney, Agent, or Firm*—Merchant, Gould, Smith, Edell, Welter & Schmidt

[57] ABSTRACT

A process for the decaffeination of raw coffee. The process involves increasing the moisture content of the raw coffee and selectively extracting caffeine from the raw coffee by using hydrous liquefied carbon dioxide as an extractant at a pressure below the critical pressure of carbon dioxide. The process differs from conventional processes which use liquefied carbon dioxide at pressures above the critical pressure but it is suprisingly found that the process of the invention does not result in the coextraction of aroma components of the coffee. The use of lower pressures means that the process of the invention is more economical than conventional processes.

5 Claims, 1 Drawing Sheet

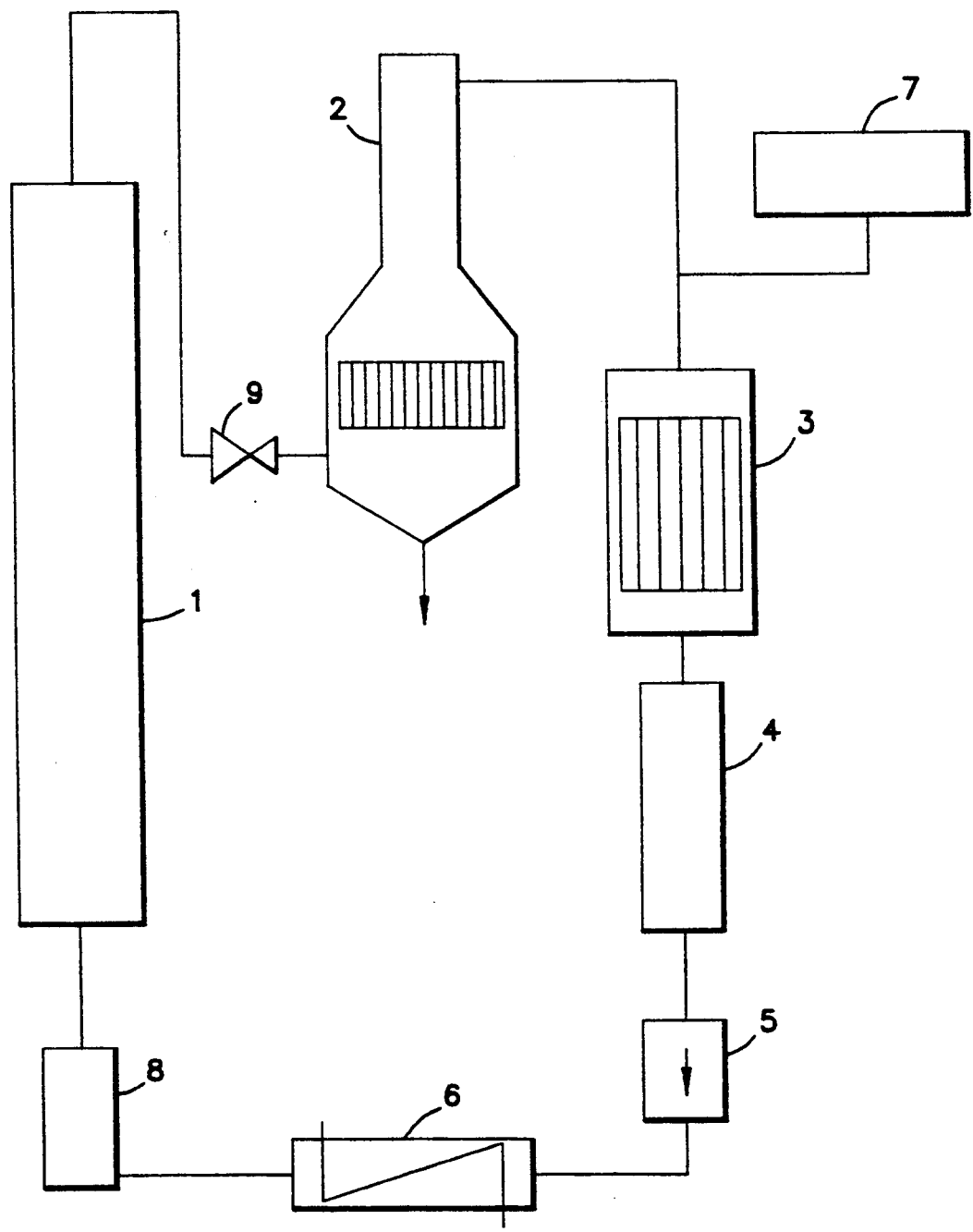

PROCESS FOR THE DECAFFEINATION OF RAW COFFEE

This is a continuation of application Ser. No. 07/488,375 filed Feb. 23, 1990, now abandoned, which in turn is a continuation of application Ser. No. 07/271,097, filed Nov. 14, 1988, now abandoned.

The patent invention relates to a process suitable for the decaffeination of raw coffee.

West German published patent application De-AS 22 12 281 describes a process wherein the extraction of caffeine is carried out by employing carbon dioxide as the extractant at a pressure above the critical pressure of carbon dioxide. The employment of a supercritical extraction pressures is considered to be necessary, since it is believed that extraction at lower pressures causes the removal of essential substances and a concomitant reduction in the aroma and taste of the coffee.

The pressures used bear considerably upon the economy of the conventional process. In this particular case, which includes the recovery of extracted caffeine by the vaporization of carbon dioxide, substantial energy losses are occasioned by large pressure differences existing between the extraction and caffeine separation steps. Despite the use of high pressures of 380 atm., the known process in which caffeine is recovered by means of $CO_2$ vaporization requires long extraction times, which can be up to 18 hours.

According to West German published patent application DE-OS 23 57 590, raw coffee is first extracted with water, whereafter the caffeine is removed from the extract solution by liquid-liquid extraction with $CO_2$ at a temperature slightly below the critical temperature and at an equilibrium pressure of carbon dioxide corresponding to such temperature. This process too is quite uneconomical since a water extraction step is required prior to the liquid-liquid extraction step, and the latter step is followed by the reimpregnation of the extracted raw coffee with the decaffeinated extract solution.

The object of the present invention is therefore the development of a similar type of process suitable for decaffeinating raw coffee, such a process being more economical than known processes and enabling an uncomplicated separation and recovery of caffeine without impairing the aroma of the coffee.

According to the invention there is provided a process for the decaffeination of raw coffee, which comprises increasing the water content of raw coffee and selectively extracting caffeine from the raw coffee with the aid of hydrous liquefied carbon dioxide at a pressure below the critical pressure of carbon dioxide.

The present invention is based upon the surprising discovery that decaffeination of raw coffee having a high water content can be accomplished, in contrast to the generally held assumption, without any loss of aroma, i.e. the decaffeination process can be carried out selectively at extraction pressures below the critical $CO_2$ pressure. By enabling the maintenance of minimal pressure differences between the extraction and caffeine separation steps, this treatment precludes, to the greatest extent possible, energy losses through pressure gradients. The caffeine separated in this manner does not differ, according to analytical criteria, from caffeine extracted at pressures above the critical pressure of carbon dioxide. The coextraction of aroma-related and constituent substances was not observed, as feared by experts.

The above-mentioned result was unexpected in view of the powerful dissolving effect of liquefied subcritical carbon dioxide on such materials, especially since its strong dissolving power has always been used in prior art processes for fully extracting the constituents substances of plant products (see, for example, Food Technology 1969, Vol. 23, 1382 and ibid., Jun. 1986, 66–69). It is this very rôle of subcritical carbon dioxide as described in the above-mentioned publication that has incited prejudice against the use of liquefied subcritical $CO_2$ for selective removal purposes.

In an advantageous embodiment of the proposed process, a water content of between 10 and 60%, preferably between 45 and 55% is suggested. The carbon dioxide should, ideally, be virtually saturated with water when introduced at the extraction stage so that the water content of the raw coffee cannot, during extraction, decrease as a result of the continuous removal of water by the carbon dioxide.

The extraction pressures can lie slightly below the critical pressure of the carbon dioxide; as the extraction pressure approaches the critical pressure, the density and consequently the dissolving power of $CO_2$ increase. The extraction pressure lies most preferably between 65 and 70 bar.

The ideal extraction temperature lies preferably between 20° and 25° C.; the lower limit of the proposed temperature range is however, determined by the permissible time span and the amount of $CO_2$ available for this process, while the upper limit of the range is determined on the one hand by the vaporization point of $CO_2$ and on the other hand by the possibility, which rises with every increase in extraction temperature, of quality damage to the coffee.

The advantage conferred by the proposed process are most effectively realized when the carbon dioxide is cycled through extraction and caffeine separation steps. The devices required for decreasing or increasing the pressure as well as for heating the carbon dioxide are complemented by a moisture regulating step, which precedes the extraction step in the cycle and ensures that the $CO_2$ is vaporized in the caffeine separation step so as to facilitate the simple and economical recovery of caffeine. This procedure furthermore enables the maintenance of the smallest possible pressure differences between the extraction and caffeine separation steps and thus allows only minimal energy loss.

The invention is described in further detail with reference to the accompanying drawing which is a schematic representation of a preferred apparatus suitable for carrying out the process of the invention.

The device illustrated in the drawing comprises an extraction vessel 1 containing raw coffee of a preset water content.

Liquefied $CO_2$ is introduced into the device initially from a supply 7, flows (upwards as in the diagram) through the extraction vessel 1 to be enriched with caffeine, which it extracts from the moist raw coffee. The $CO_2$ has, in this embodiment, a pressure of approximately 70 bar and a temperature of approximately 22° to 23° C.

The liquefied $CO_2$, which is loaded with caffeine together with a small quantity of water, flows from extraction vessel 1 through a release valve 9 into a separator vessel 2, where it expands to about 60 bar. The temperature drop resulting from $CO_2$ expansion is counteracted by the supply of an equivalent amount of heat to the system.

The caffeine, caffeine-saturated water and $CO_2$ separate in separator vessel 2. The gaseous $CO_2$, relieved of caffeine, is, together with water, released at the top of separator vessel 2 and enters a condenser 3, in which the $CO_2$ is re-liquefied. The re-liquefied $CO_2$ flows through a collector vessel 4 (this step may be omitted if required) to a pump 5, which recirculates the $CO_2$ through a heat exchanger 6 and a water container 8 to the bottom of extraction vessel 1. Heat exchanger 6 raises the temperature of the liquefied $CO_2$ again to the extraction temperature of approximately 22° to 23° C. The $CO_2$ is saturated with water in the water container 8.

The $CO_2$, thus loaded with water, flows again through extraction vessel 1 to extract more caffeine from the raw coffee.

The raw coffee is decaffeinated to the extent required, removed from the extraction vessel 1 and replaced with fresh raw coffee.

The caffeine deposited in the separator vessel 2 as a result of $CO_2$ vaporization can be discharged at purity of over 99% from the base of separator vessel 2.

We claim:

1. A method for decaffeinating raw coffee beans comprising:

increasing the water content of the raw coffee beans to between 45 and 55% to produce hydrated beans; and extracting caffeine but not aroma-related and constituent substances from the hydrated beans by contacting the hydrated beans with liquid carbon dioxide substantially saturated with water under the conditions of a subcritical carbon dioxide pressure within a range of 65 to 70 bar, and a temperature in a range of 20° to 25° C. to produce decaffeinated hydrated beans containing essentially all aroma-related and constituent substances present in the hydrated beans before extraction.

2. The method of claim 1 wherein said caffeine is separated from said liquid carbon dioxide following the extraction step.

3. The method of claim 2 wherein said liquid carbon dioxide is vaporized during the caffeine separation step.

4. The method of claim 2 wherein the variation of carbon dioxide pressure between the extraction and caffeine separation steps is smaller than 30 bar.

5. The method of claim 2 wherein the variation of carbon dioxide pressure between the extraction and caffeine separation steps is smaller than 10 bar.

* * * * *

UNITED STATES PATENT AND TRADEMARK OFFICE
CERTIFICATE OF CORRECTION

PATENT NO. : 5,135,766
DATED : August 4, 1992
INVENTOR(S) : Hermsen, et. al.

It is certified that error appears in the above-indentified patent and that said Letters Patent is hereby corrected as shown below:

Title page, item [30], Foreign data, delete"3738783 and insert therefor --373873.9--

Column 1, line 9, delete "patent" and insert therefor --present--; and

Signed and Sealed this

Twenty-second Day of August, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,135,766
DATED : August 4, 1992
INVENTOR(S) : Hermsen, et. al.

It is certified that error appears in the above-indentified patent and that said Letters Patent is hereby corrected as shown below:

Title page, item [30], Foreign data, delete"3738783 and insert therefor --373873.9--

Column 1, line 9, delete "patent" and insert therefor --present--; and

Signed and Sealed this

Eighteenth Day of June, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,135,766

DATED : August 4, 1992

INVENTOR(S) : Hermsen et al.

It is certified that error appears in the above-identified patent and that said Letters Patent is hereby corrected as shown below:

Title page,
At [73] line Assignee, please delete "CR" and insert therefor --CR3--; and At [75] line Inventors, please delete "Bremem" and insert therefor --Bremen--.

Signed and Sealed this

Fourteenth Day of January, 1997

Attest:

BRUCE LEHMAN

Attesting Officer

Commissioner of Patents and Trademarks